United States Patent
Wu et al.

(10) Patent No.: US 10,594,882 B1
(45) Date of Patent: Mar. 17, 2020

(54) DOCUMENT FEEDING STRUCTURE

(71) Applicant: CHENG UEI PRECISION INDUSTRY CO., LTD., New Taipei (TW)

(72) Inventors: Yu Yuan Wu, New Taipei (TW); Kuo Shing Wang, New Taipei (TW); Pai Hsien Su, New Taipei (TW); Wen Yu Wang, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/407,637

(22) Filed: May 9, 2019

(30) Foreign Application Priority Data

Jan. 25, 2019 (TW) .............................. 108201211 U

(51) Int. Cl.
*H04N 1/00* (2006.01)
*H04N 1/12* (2006.01)

(52) U.S. Cl.
CPC ..... *H04N 1/00602* (2013.01); *H04N 1/00594* (2013.01); *H04N 1/00615* (2013.01); *H04N 1/121* (2013.01)

(58) Field of Classification Search
CPC ... H04N 1/0057; H04N 1/121; H04N 1/00594
See application file for complete search history.

(56) References Cited

U.S. PATENT DOCUMENTS

| 2006/0067760 A1* | 3/2006 | Shimizu | G03G 15/605 |
| | | | 399/377 |
| 2007/0177226 A1* | 8/2007 | Ishida | H04N 1/00543 |
| | | | 358/474 |

* cited by examiner

*Primary Examiner* — King Y Poon
*Assistant Examiner* — Michael Burleson
(74) *Attorney, Agent, or Firm* — WPAT, PC

(57) ABSTRACT

The present invention relates to a document feeding structure including a feeding path; a scanning unit, said scanning unit being arranged on one side of said feeding path to scan documents passing through said feeding path; a transmitting roller, said transmitting roller arranged opposite to said scanning unit and covering the whole feeding path; and a pressing plate, said pressing plate including a fixed end, a free end disposed in said feeding path to contact with said transmitting roller and an extending portion connecting said free end and said fixed end, wherein said pressing plate covering the whole feeding path.

8 Claims, 6 Drawing Sheets

US 10,594,882 B1

DOCUMENT FEEDING STRUCTURE

CROSS-REFERENCE TO RELATED APPLICATION

The present application is based on, and claims priority from, Taiwan Patent Application No. 108201211, filed Jan. 25, 2019, the disclosure of which is hereby incorporated by reference herein in its entirety.

BACKGROUND OF THE INVENTION

1. Field of the Invention

This invention relates to a document feeding structure, particularly a document feeding structure designed for the portable scanner which lets users choose where to put documents at will

2. The Related Art

Referring FIG. 1A, most of the scanner with automatic document feeder nip documents with a pair of feed roller 40 and idle roller 41. Said idle roller 41 applies a normal force to the document to ensure the friction between the document and said feed roller 40 is big enough to avoid the document slipped with said feed roller 40. However, said feed roller 40 and said idle roller 41 are not completed fitted and there is still a space 35 between each other, thus the document may still lose the transmitting force while the document is too thin or placed in a wrong place.

As shown in FIG. 1B, in order to avoid said transmitting error, a guiding plate 42 is arranged on the upstream of said feed roller 40 in this embodiment. Said guiding plate 42 limits the position of the document to avoid the document fall into space 35. However, this design also limits the size and the placement position of the document, make it less convenient for the user.

Referring to FIG. 1C now, in another conventional design, the width of said feed roller 40 and idle roller 41 is enlarged to cover the while feeding path. Thus, the space between rollers is eliminated and the user can scan any size of the document and any place to place the document in this design. However, in order to fit said idle roller 41 and the structures to hold said idle roller 41 in, the volume and the production cost of said scanner are also increased and makes it unsuitable for the portable scanner.

SUMMARY OF THE INVENTION

The objective of the present invention is to provide a document feeding structure to overcome the lack and defects in the conventional document feeding structure.

To achieve said objective, the present invention discloses a document feeding structure comprises: a feeding path; a scanning unit arranged on one side of said feeding path for scanning documents passed through; a transmitting roller arranged on the opposite side of said feeding path and covering the whole feeding path; and a pressing plate including a fixed end, a free end arranged in said feeding path to contact with said transmitting roller, and an extending portion connected between said fixed end and said free end, wherein said pressing plate arranged to cover the whole feeding path.

In a preferred embodiment, said pressing plate is bendable along the direction being perpendicular to said feeding path.

In a preferred embodiment, while the deformation of said pressing plate equals to 2 mm, the deformation area of which being arranged to be less than 20 mm.

In a preferred embodiment, the thickness/width ratio of said extending portion is less than 0.0016.

In a preferred embodiment, a plurality of notch is arranged on said free end, said notch being cut from the edge of said free end toward said extending portion.

In a preferred embodiment, a plurality of opening is cut on said extending portion, said opening arranged along the direction perpendicular to the feeding direction.

In a preferred embodiment, said fixed end is secured on said scanning unit to hold said pressing plate close to the outer contour of said scanning unit.

In a preferred embodiment, a damping unit is arranged between said pressing plate and said scanning unit

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

In order to describe the technical contents, structural features, purpose to be achieved and the effectiveness of the present invention, the detailed description is given with schema below.

Figure 2A:
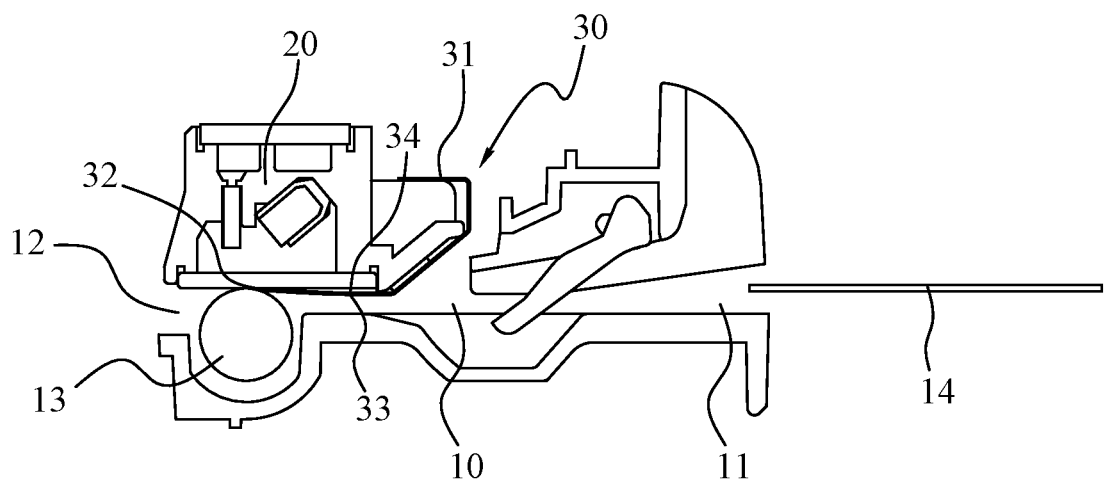
FIG. 2A shows a sectional view of the document feeding structure in the present invention.
Figure 2B:
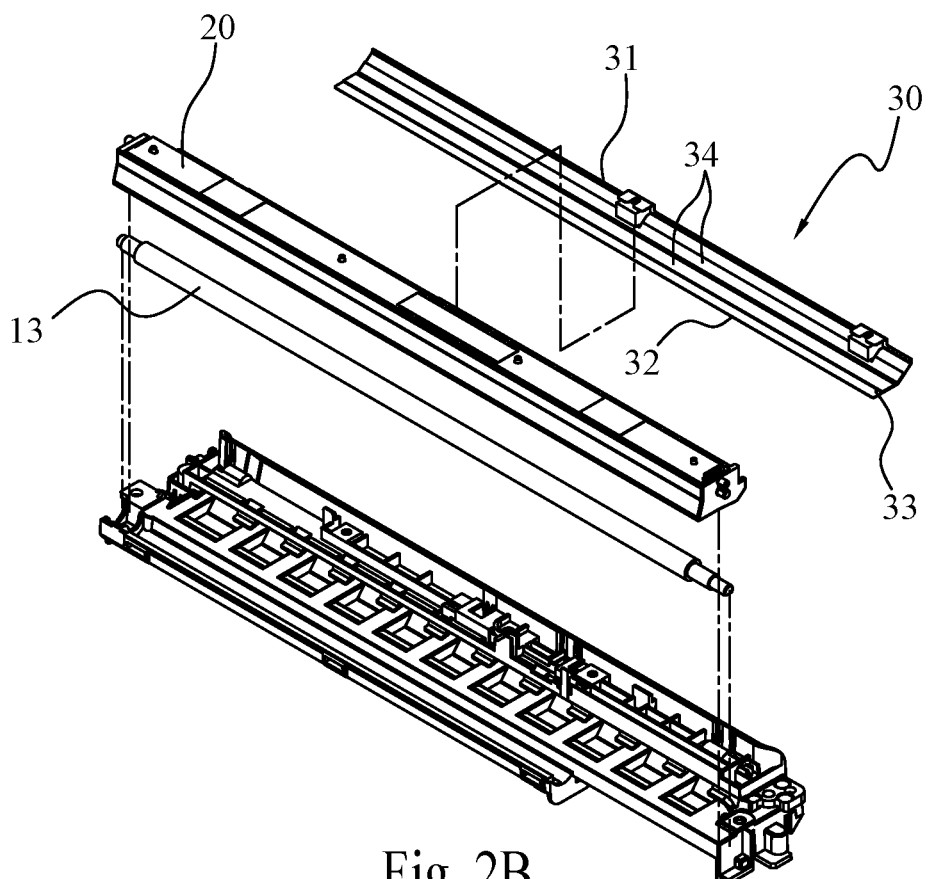
FIG. 2B shows an exploded view of the document feeding structure in the present invention.
Figure 5:
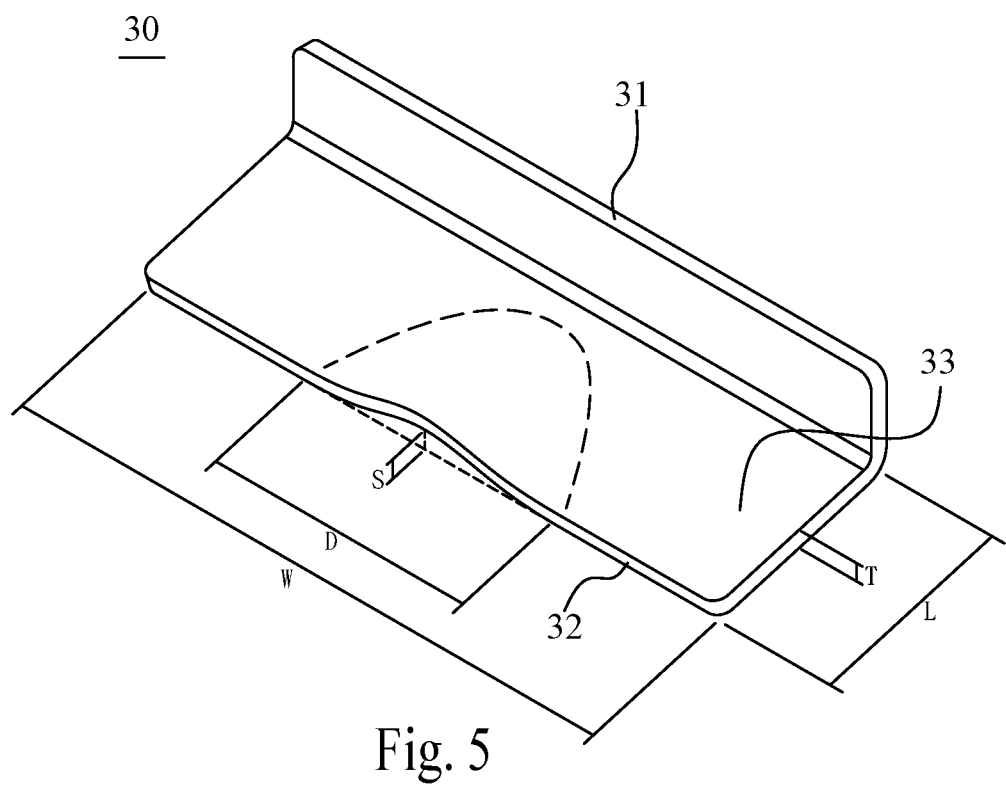
FIG. 5 is a schematic diagram shows the pressing plate deformed under external force.

Referring to FIG. 2A, FIG. 2B and FIG. 5, the document feeding structure in the present invention comprises a feeding path 10 comprising an inserting end 11 and an ejecting end 12 for guiding documents to be scanned 14 pass through; a scanning unit 20 arranged on one side of said feeding path 10 for scanning said documents to be scanned 14; a transmitting roller 13 arranged opposite to said scanning unit 20 and the width of which is long enough to cover the whole feeding path 10; and a pressing plate 30 comprising a fixed end 31 secured to said scanning unit 20, a free end 32 arranged in said feeding path 10 to contact with said transmitting roller 13, and an extending portion 33 connected between said fixed end 31 and said free end 32, wherein the width of said pressing plate 30 is big enough to cover the whole feeding path 10.

Figure 1A:
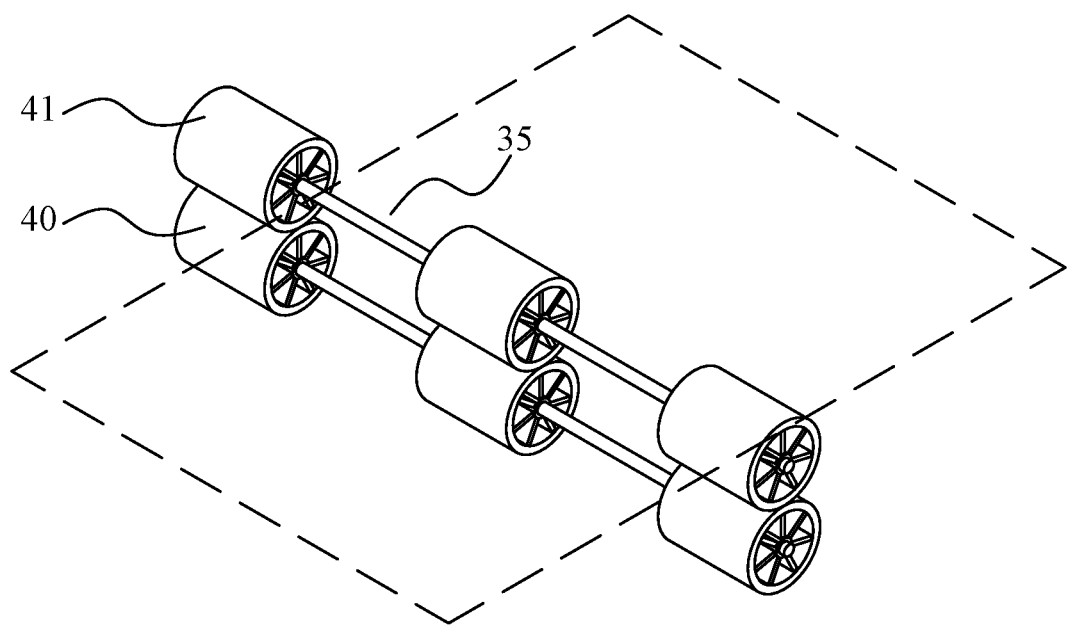
FIG. 1A shows a perspective view of a conventional document feeder.
Figure 1B:
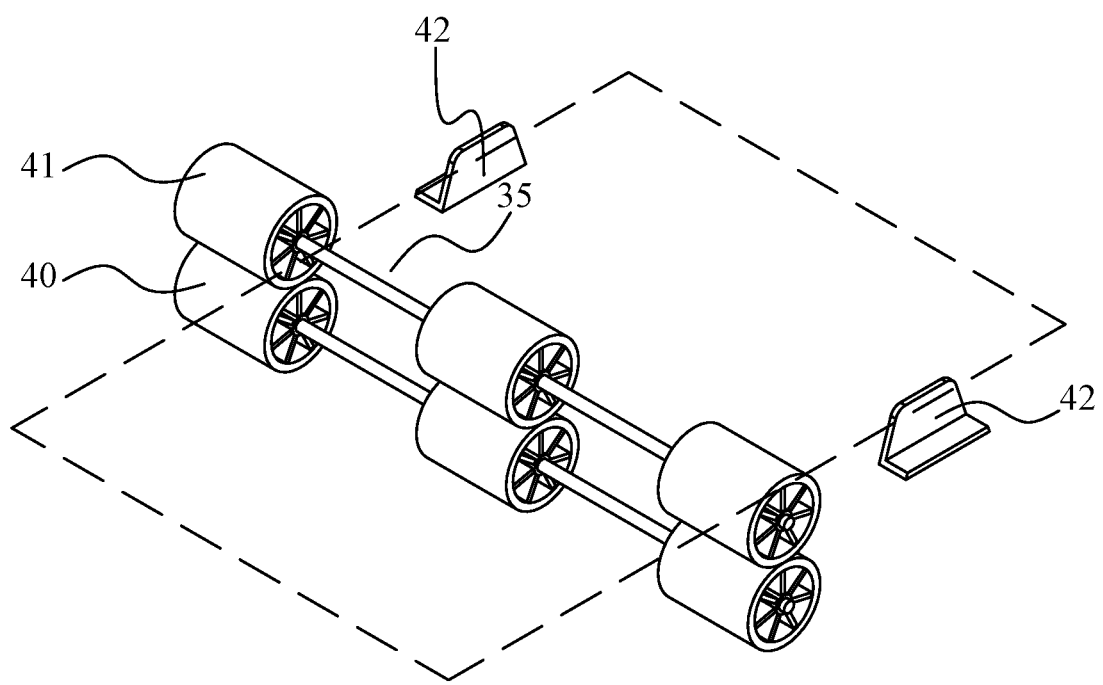
FIG. 1B shows a perspective view of another conventional document feeder.
Figure 1C:
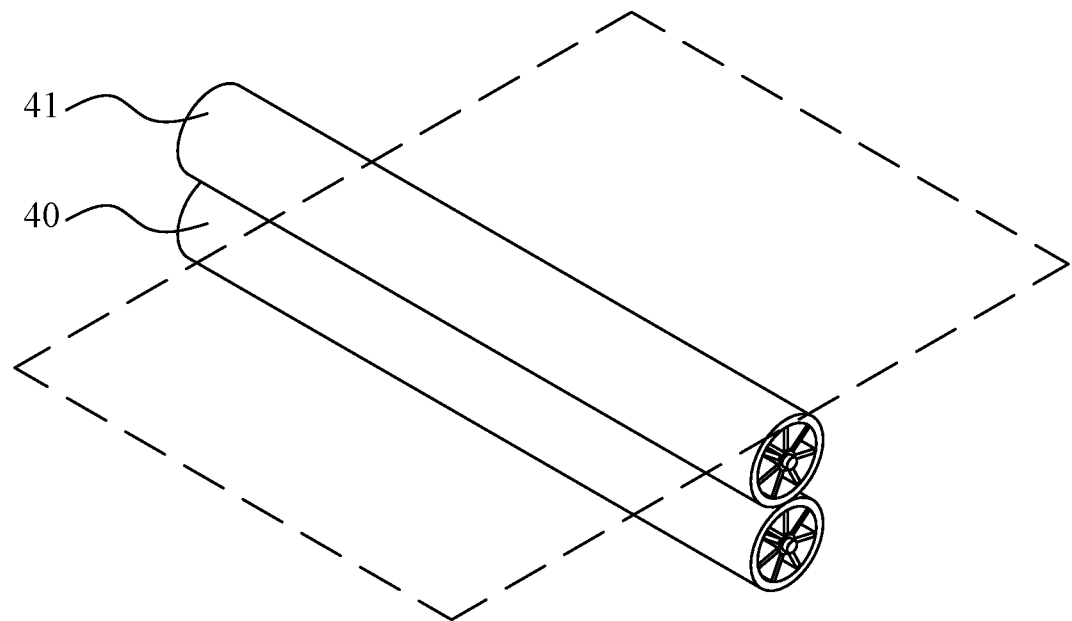
FIG. 1C shows a perspective view of another conventional document feeder.
Figure 3:
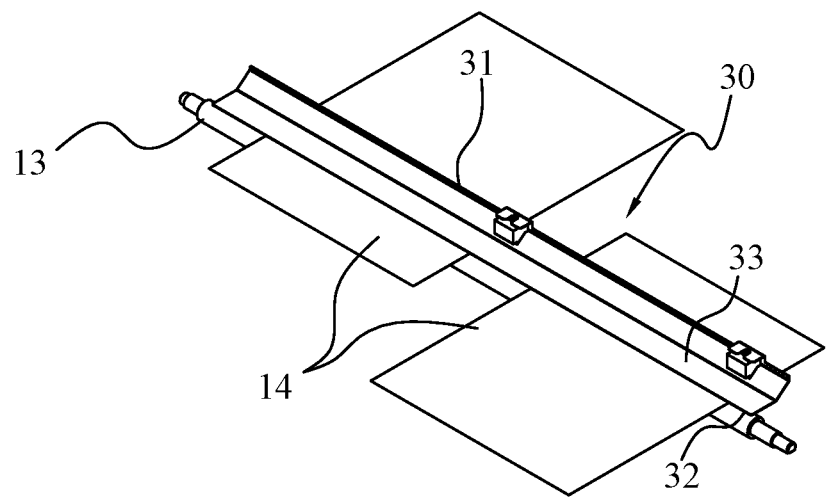
FIG. 3 is a schematic diagram that shows transmitting documents with the pressing plate in the present invention.

As shown in FIG. 3, the document feeding structure in this invention arranged with a pair of full width said transmitting roller 13 and said pressing plate 30 to ensure the documents can be feed properly no matter how the size and where the position of the document is. Besides, said fixed end 31 of said pressing plate 30 is secured on said scanning unit 20 to hold said pressing plate 30 close to the outer contour of said scanning unit 20. Therefore, it takes less space comparing to the conventional design shown in FIG. 1C.

Referring to FIG. 2A and FIG. 2B now, in order to reduce the vibration of said pressing plate 30 during the feeding process, a damping unit 34 is arranged to said extending portion 33. Said damping unit 34 is made of shock absorption material and arranged between said pressing plate 30 and said scanning unit 20 to absorb the vibration of said pressing plate 30, moreover, to increase the stability while feeding documents.

Figure 4:
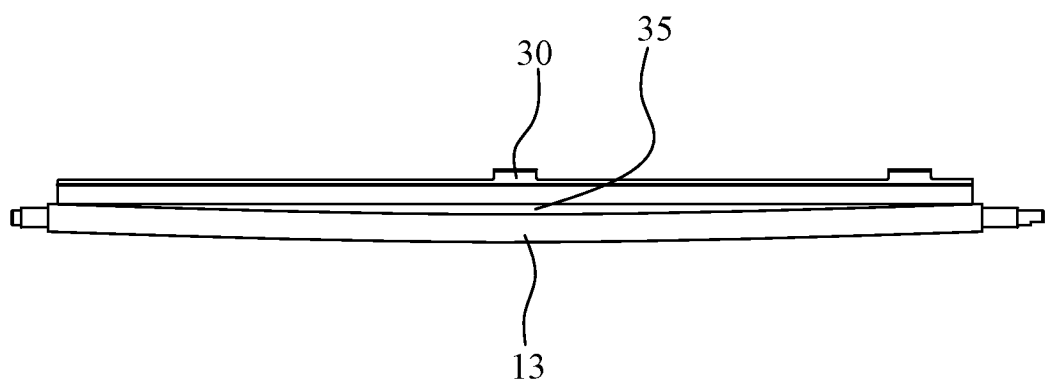
FIG. 4 is a schematic diagram shows the bending of the transmitting roller.

Referring to FIG. 4, in order to ensure the feeding force applied to said documents to be scanned 14 stayed constant, said transmitting roller 13 have to be contact with said documents to be scanned 14 during the whole scanning process, and any gaps 35 between said transmitting roller 13 and said pressing plate 30 could cause misfeeding. However, both said transmitting roller 13 and said pressing plate 30 could be a little bent or curved due to the manufacturing tolerance which would result in the tiny gaps 35 between said documents to be scanned (not shown) and said transmitting roller 13. In that case, if the thickness of said documents to be scanned 14 is less than said gap 35, said documents to be scanned 14 would slip with said transmitting roller 13 and cause misfeeding.

To solve said gap problem, said pressing plate 30 in this invention is made bendable on the direction which is perpendicular to said feeding path 10 to fit with the surface of said transmitting roller 13. As shown in FIG. 5, (not drawn in actual scale) while the deformation (S) of said pressing plate 30 equals to 2 mm, the deformation area (D) is preferred to be less than 20 mm for better gap-eliminate performance. With said arrangement, said extending portion 33 is easy to bend with the outer contour of said transmitting roller 13 and thus eliminates said gap 35 between said transmitting roller 13 and said pressing plate 30.

In order to improve the flexibility of said pressing plate 30 on the direction which is perpendicular to said feeding path 10, the thickness (T) and the length (L) of said pressing plate 30 being set to a very small amount related to the width (W) of which in this embodiment. In a preferred value range, while the width (W) of said extending portion 33 being set to 125 mm, the thickness (T) of said extending portion 33 is set to less than 0.2 mm, and the thickness (T)/width (W) ratio of said extending portion 33 is less than 0.0016 so as to weaken the resistance for the torque parallel to the feeding direction.

Figure 6:
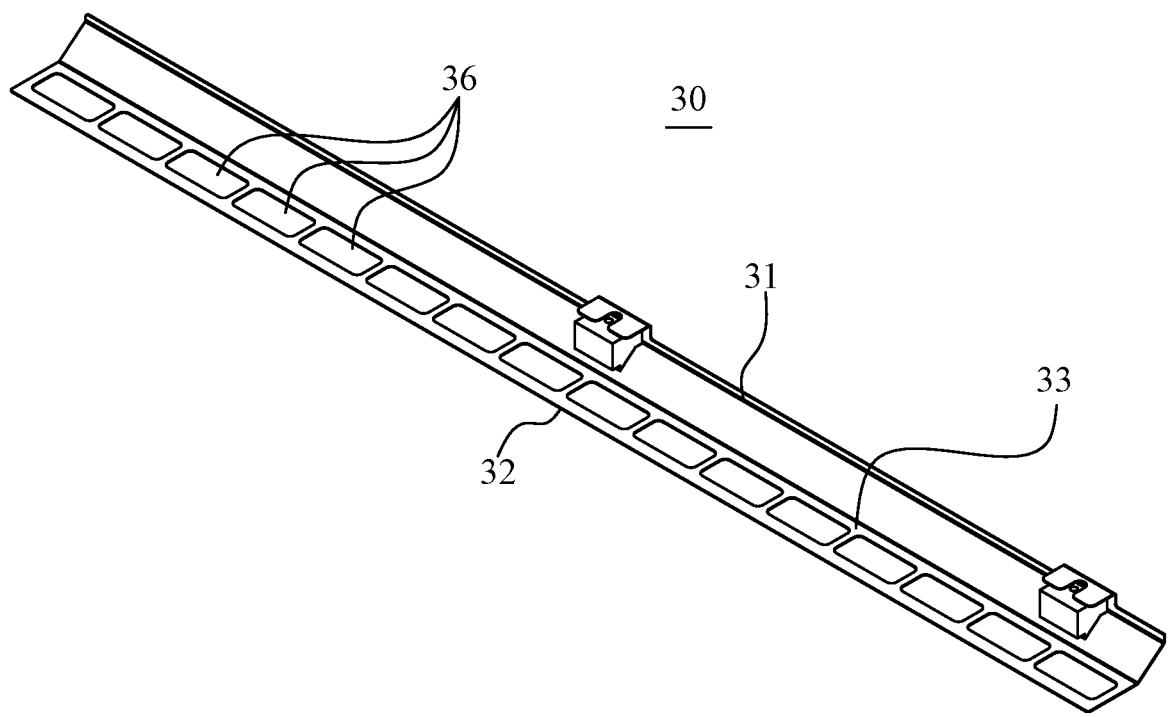
FIG. 6 shows a perspective view of the pressing plate in another embodiment.

Referring to FIG. 6 now, another preferred embodiment as shown in FIG. 6 shows another method to make the torque resistance of said pressing plate 30 non-homogenized to increase the flexibility along the direction perpendicular to the feeding direction. In this embodiment, a plurality of openings 36 being cut on said extending portion 33, said openings 36 arranged along the direction perpendicular to the feeding direction. Thus, the strength of said extending portion 33 is weakened, especially in the direction perpendicular to the feeding direction. With said design, the flexibility of said extending portion 33 increases and makes it easier to fit the surface of said transmitting roller 13, moreover, eliminates the gap 35 between said transmitting roller 13 and said pressing plate 30.

Figure 7:
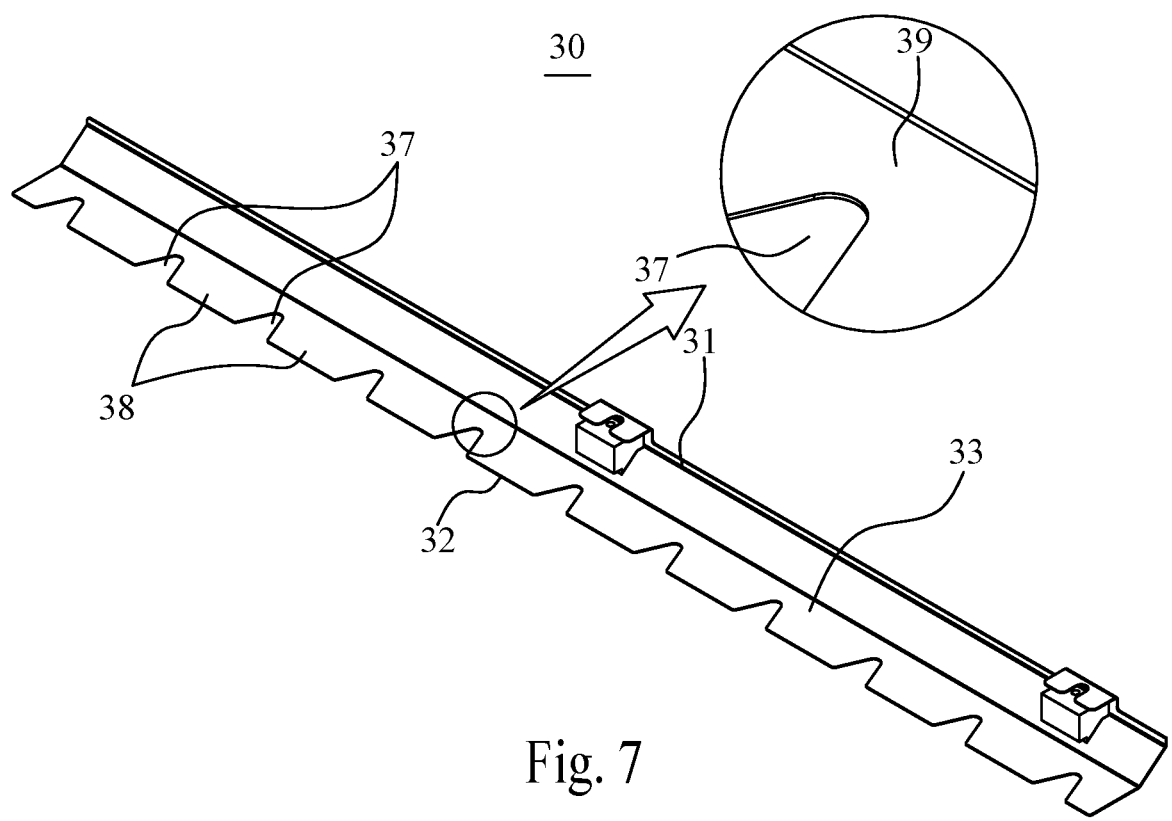
FIG. 7 shows a perspective view of the pressing plate in another embodiment.

Referring to FIG. 7 now, in another preferred embodiment shown in FIG. 7, a plurality of notches 37 being cut on the edge of said free end 32 to make said pressing plate 30 non-homogenized. In this embodiment, said notch 37 is cut from the edge of said free end 32 toward said extending portion 33 to separate said extending portion 33 into several sub-pressing plates 38. Every of two said sub-pressing plates 38 are joined with a joint section 39, and said joint section 39 is narrower than said sub-pressing plate 38. Thus, said joint section 39 is much easier to deform under external force due to stress concentration, and increases the flexibility of said pressing plate 30. With this design, said extending portion 33 is much easier to fit the surface of said transmitting roller 13 and to eliminate said gap 35 between said transmitting roller 13 and said pressing plate 30.

As described above, the present invention discloses a document feeding structure for portable scanner letting users choose where to put documents at will.

What is claimed is:

1. A document feeding structure comprises:
   a feeding path;
   a scanning unit arranged on one side of said feeding path for scanning documents passed through;
   a transmitting roller arranged on opposite side of said feeding path and covering the whole feeding path along a width direction; and
   a pressing plate including a fixed end, a free end arranged in said feeding path to contact with said transmitting roller, and an extending portion connected between said fixed end and said free end, wherein said pressing plate arranged to cover the whole feeding path along the width direction.

2. The document feeding structure as claimed in claim 1, wherein said pressing plate is bendable along direction being perpendicular to said feeding path.

3. The document feeding structure as claimed in claim 1, wherein while deformation of said pressing plate equal to 2 mm, deformation area of which is arranged to be less than 20 mm.

4. The document feeding structure as claimed in claim 1, wherein thickness/width ratio of said extending portion is less than 0.0016.

5. The document feeding structure as claimed in claim 1, wherein a plurality of notches is arranged on said free end, said notches are cut from edge of said free end toward said extending portion.

6. The document feeding structure as claimed in claim 1, wherein a plurality of openings is cut on said extending portion, said openings are arranged along the width direction.

7. The document feeding structure as claimed in claim 1, wherein said fixed end is secured on said scanning unit to hold said pressing plate close to outer contour of said scanning unit.

8. The document feeding structure as claimed in claim 1, a damping unit is arranged between said pressing plate and said scanning unit.

* * * * *